Figure 1:
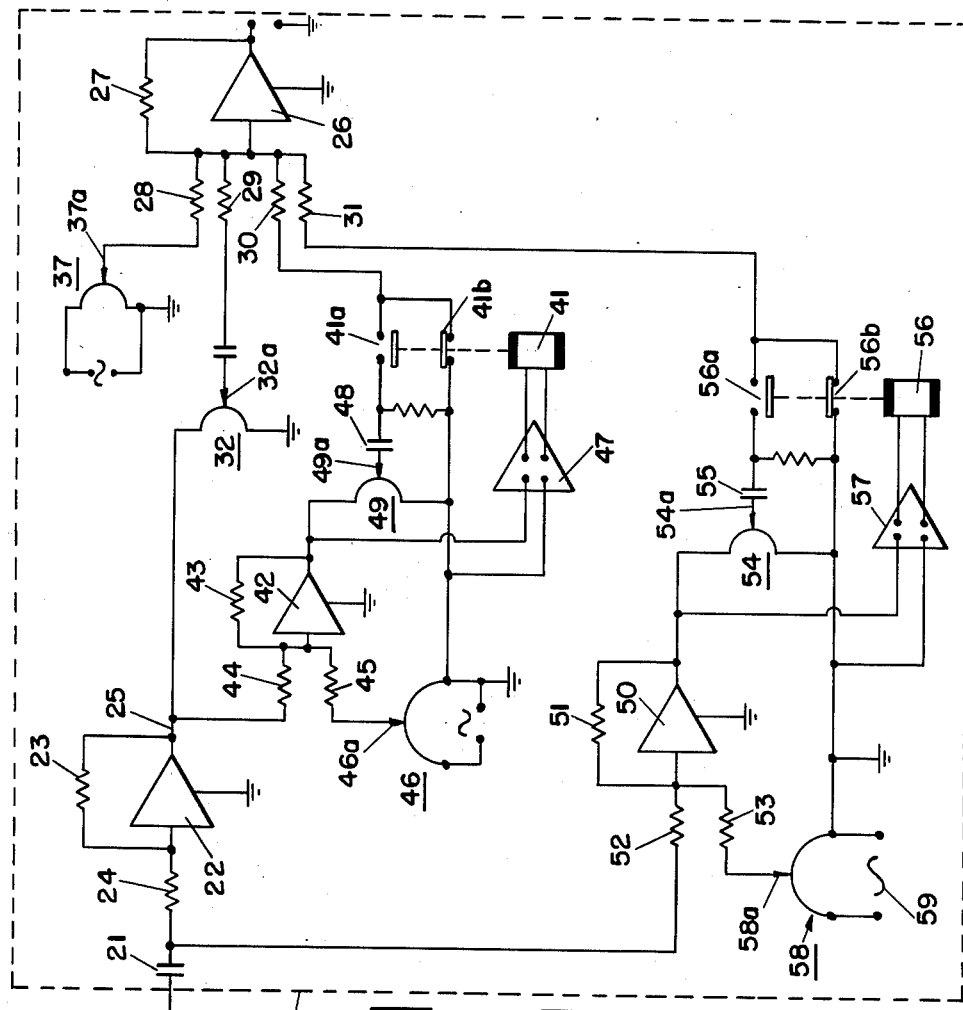
Figure 1:
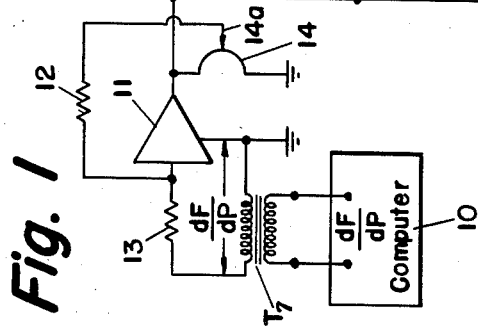

Oct. 23, 1962 F. B. DAVIS 3RD 3,059,853
ALTERNATING CURRENT FUNCTION GENERATOR
Filed June 17, 1959

United States Patent Office 3,059,853
Patented Oct. 23, 1962

3,059,853
ALTERNATING CURRENT FUNCTION
GENERATOR
Frederick Beam Davis 3rd, Drexel Hill, Pa., assignor to Leeds and Northrup Company, Philadelphia, Pa., a corporation of Pennsylvania
Filed June 17, 1959, Ser. No. 821,056
13 Claims. (Cl. 235—197)

This invention relates to function generators particularly adapted to reproduce electronically from inputs representative of the incremental heat rate, output characteristics representative of generator outputs corresponding with the incremental heat rate curves of said generators supplying a common load.

As explained in Early Patent 2,836,730, it is necessary, in order to achieve economic loading of power systems, to reproduce the characteristic curves of the generators which relate incremental cost with generation. Incremental cost relationships of generators are seldom linear over the entire operating range of the generator. Instead, there frequently occurs a relatively sharp change in the incremental cost of generation curve. Accordingly, it becomes important, in systems having for their purpose the achievement of economic loading of power systems, to reproduce the incremental-cost generation-characteristics of generators in order that each generator may be operated on that part of its input-output characteristic curve having the same slope as the operating point on corresponding curves for other generators.

As explained in said Early patent, this may be accomplished by winding slidewires or resistors for the production of outputs corresponding with such incremental-cost curves, or by providing shunting circuits together with auxiliary sources in reproduction of abrupt changes in such curves. Though function generators of the kind described in said Early patent have been utilized and are in general satisfactory, they nevertheless leave something to be desired both in flexibility and in elimination of substantial heat dissipation.

It is an object of the present invention electronically to reproduce, by the use of summing amplifiers to which there are applied alternating current input signals, the function of unit incremental heat rate or incremental cost of generation versus unit generation notwithstanding the fact that such incremental cost of generation curves may be discontinuous and may have slopes which radically differ one from the other for different loads on a generator.

In carrying out the present invention in one form thereof, there are utilized standard components in a system in which there may be readily reproduced the relationship between unit generation and incremental cost of generation throughout the operating range of the generator. More particularly, there is utilized a summing amplifier having a negative feedback circuit and a first alternating current input circuit. The alternating current input signal is applied to the input circuit by way of a variable resistor, such as a potentiometer, to establish for that particular input circuit a selected value of amplifier-gain. A second input circuit applies, through a variable resistor such as a potentiometer, a second alternating current signal having a magnitude selected to introduce an offset or a shift in the intercept of the characteristic curve established by the first input circuit. By means of additional input circuits to the summing amplifier, each including a summing amplifier of the negative feedback type, the slope of the characteristic curve may be changed in either direction and at times corresponding with the occurrence of predetermined values of the incremental heat rates for the generator. Such additional input circuits may include provisions for introducing variations representing one or more discontinuities in the aforesaid characteristic curve. Each said additional summing amplifier includes phase-sensitive relay means operable in response to a change in phase in the output from the additional amplifier in order to apply a characteristic-varying change to the first-discussed summing amplifier.

For further objects and advantages of the invention and for a detailed discussion of the components and their operation, reference is to be had to the following description taken in conjunction with the accompanying drawings, in which:

FIG. 1 schematically illustrates a system embodying the invention; and

Figure 2:
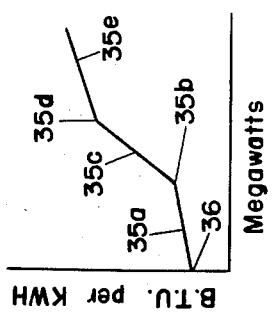

FIG. 2 is a graph useful in explaining the operation of the system of FIG. 1.

Referring now to FIG. 1, there has been illustrated an input transformer $T_7$, having the same reference character as used to identify a corresponding input transformer in FIG. 2 of the said Early Patent 2,836,730. As explained by him in his said patent, there is produced at the secondary winding of the transformer $T_7$ a control voltage varying in accordance with the incremental cost of generation.

An input signal, representative of the incremental cost of generation, defined as $$\frac{dF}{dP}$$

is obtained from a computer 10, the details of which are fully disclosed and the operation explained in said Early patent. As shown in FIG. 1, the alternating current input signal from the secondary winding of transformer $T_7$ is applied to an amplifier 11 of the negative feedback type and including feedback resistor 12 and an input resistor 13. It will be noted that the feedback resistor 12 is connected through an adjustable contact 14a to an output resistor 14 forming a potentiometer. By adjusting contact 14a in accordance with the fuel cost for a station there is produced at the output of amplifier 11 an output signal varying with and proportional to the desired incremental heat rate for that station for most economical operation of the system. Since the station may include a plurality of generators, the output from amplifier 11 is applied to potentiometers 15, 16 and 17 corresponding in number with the number of generators in the station. From each potentiometer there is derived as by way of movable contacts 15a, 16a and 17a fractional parts of the output signal for application to function generators 18, 19 and 20. Each of contacts 15a–17a will be set to a position for modification of the output voltage from amplifier 11 to take into account the efficiency of the particular generator, more accurately, to reproduce in the form of an output signal its incremental heat-rate characteristic curve.

Since the function generators 18–20 are identical, only the function generator 18 has been illustrated in detail. The alternating current output signal as derived from potentiometer 15 is applied by way of a coupling capacitor 21 to the input circuit of an interposed phase-reversing amplifier 22 of the negative feedback type and having equal-valued control resistors, one a negative feedback resistor 23 and the other an input resistor 24, for producing output signals equal in amplitude to the input signals. The output from amplifier 22 is applied to a conductor 25 which forms a part of a first input circuit to a summing amplifier 26 of the negative feedback type and including a negative feedback resistor 27 and associated input resistors 28, 29, 30 and 31. A signal applied to one or more of the input resistors will establish a corresponding component in the output signal from the summing amplifier.

It will be noted that there is included in the first input circuit a potentiometer 32, the movable contact 32a of which is set to a position to establish the desired proportionality between change in the incremental heat rate and the change in generation of the generator. Thus the potentiometer 32 is used to establish the slope of the characteristic curve between the input and the output of the amplifier 26 to correspond with the characteristic curve of the generator. More particularly, the potentiometer 32 is utilized to establish the slope of the segment 35a of the incremental heat rate curve shown by the graph of FIG. 2 in which megawatts have been plotted as abscissae against B.t.u.'s per kilowatt hour as ordinates.

As well understood by those skilled in the art, the incremental heat rate curve 35a does not have its origin at zero, but instead, has an intercept with the vertical axis as indicated at 36 in FIG. 2. This offset-from-zero in the curve 35a means that at zero output there is an incremental heat rate for the generator. The offset in FIG. 2 is introduced in the operation of the summing amplifier 26 by means of a second input circuit including the resistor 28 and a potentiometer 37 energized from an alternating current source of supply as indicated by the symbol. For a given "B.t.u. per kwh." input as shown at 36, FIG. 2, the contact 37a of potentiometer 37 is adjusted to produce zero output of amplifier 26.

With the system of FIG. 1 as thus far described, it will be seen that the output of the summing amplifier 26 will follow the characteristic curve 35a of FIG. 2. Such an amplifier output may be utilized as the voltage $e_{153}$ of FIG. 2 of said Early Patent 2,836,730 and in association with other features of said FIG. 2 including the upper and lower limit-switches.

Referring now to FIG. 2 of the present application, it will be seen that the characteristic curve 35a terminates in a break point 35b and that thereafter the incremental heat rate curve has a slope as indicated by the segment 35c. In order to take into account the change in slopes as between segments 35a and 35c, there is provided an additional input circuit to said summing amplifier 26 as by way of an input resistor 30. This additional input circuit is normally disconnected as by the open contacts 41a of a relay means 41. As shown, the additional input circuit is connected to ground through normally closed contacts 41b of relay 41. The ground connection is utilized to eliminate stray signals due to alternating current pick-up. Included in the additional input circuit is an additional summing amplifier 42 of the negative feedback type and provided with a negative feedback resistor 43 and associated input resistors 44 and 45. One input circuit to summing amplifier 42 has applied through resistor 44 the signals as appearing on conductor 25.

From a potentiometer 46 energized from an alternating current source as indicated by the symbol, there is applied a second input signal opposite in phase in the input circuit of amplifier 42 to the signal derived from conductor 25. The input circuit of a phase-sensitive amplifier 47 is connected to the output of amplifier 42 and is used to control the operation of the relay 41.

The contact 46a of potentiometer 46 is set to a point to apply to the amplifier 42 a voltage of amplitude equal to that of the signal on conductor 25 at the time of attainment of the break point 35b. As soon as the signal on conductor 25 exceeds the value so set by contact 46a there is a reversal in phase in the output of the amplifier 42. The phase-sensitive amplifier 47, having high forward gain, responds to the change in phase of the output from amplifier 42 and thus energizes the relay means 41 to connect the additional input circuit of summing amplifier 26 by way of a coupling capacitor 48 to a potentiometer 49 energized from the output of amplifier 42. The contact 49a of potentiometer 49 is set to a position for the establishment of a characteristic at the output of the summing amplifier 26 having the same slope as the curve 35c of FIG. 2. This takes place since the output from amplifier 42 as derived by contact 49a is of opposite phase from the signal on conductor 25 and hence is subtracted in the input to the summing amplifier 26 from the signal introduced by way of the input resistor 28. The result is a steeper slope for segment 35c of FIG. 2, steeper than segment 35a.

Further in connection with the operation of the relay means 41, it is to be noted that it is energized by way of the phase-sensitive amplifier 47. This occurs when the output from the additional summing amplifier 42 has a negligibly low value, i.e., while adequately large to produce an output from the high gain amplifier 47 sufficient to energize relay 41, it is negligible in producing an output voltage at contact 49a of any substantial magnitude. This means that there is a transition from curve 35a to curve 35c at the break point 35b characterized by lack of offset or displacement. Instead of an offset, there is a smooth transition from one slope of the characteristic curve 35a to the higher slope of the characteristic curve 35c.

As many additional input circuits as may be desired may be provided for the summing amplifier 26. These may correspond with the additional summing circuit just described to provide additional segments of increased slope or they may correspond with the second additional summing circuit now to be described for producing an additional segment with decreased slope and which includes a second additional summing amplifier 50 having a negative feedback resistor 51 and associated input resistors 52 and 53. The additional input circuit includes a potentiometer 54, coupling capacitor 55, relay 56 having normally closed contacts 56b and normally open contacts 56a which serve to complete the circuit to the input resistor 31 of summing amplifier 26. There is also provided a phase-sensitive amplifier 57 for controlling the energization of the relay 56. While the potentiometer 58 is structurally the same as the potentiometer 46, it functions in a somewhat different way since it is energized from an alternating current source which, as indicated by the symbol 59, is of instantaneous phase opposite to that utilized for the energization of potentiometer 46. By reason of the reversal of phase taken in conjunction with other features hereinafter to be described, there will be achieved at the transition point 35d a decrease in the slope of the characteristic curve corresponding with that illustrated by the curve 35e in contrast with the slope of 35c.

It will be remembered that the input signal applied to summing amplifier 26 by way of input resistor 30 acted in a subtractive manner with respect to the input signal applied by resistor 29. That signal is subtractive by reason of the fact there occurs a reversal in phase in the output signal from amplifier 42 relative to its input signal as derived from conductor 25. Thus an input signal at input resistor 30 having a phase opposite to that of the signal applied by way of input resistor 29 acts in a subtractive manner. The input signal applied to summing amplifier 26 by way of resistor 31 will be additive with respect to the input signal applied by resistor 29 by reason of the fact that the input signal to amplifier 50 is derived ahead of amplifier 22 and therefore has a phase opposite to that of the signal at conductor 25 and in view of the phase reversal introduced by amplifier 50 the output signal from amplifier 50, is in phase with the signal on conductor 25.

Since the source 59 is reversed in phase relative to the source for potentiometer 46, it will be seen that the signal applied by way of input resistor 53 to summing amplifier 50 is opposed to the input signal applied by way of input resistor 52. Thus while the summing amplifier 50 functions in a similar manner to the amplifier 42, the output signal derived therefrom and applied to the summing amplifier 26 after operation of the relay 56 will act in a cumulative or additive manner with respect to the signal applied by way of input resistor 29. The action of the additional cumulative signal reduces the slope of the characteristic curve.

While summing amplifiers of the type utilized herein are well known in the art, reference may be made to the article entitled "Transistor Circuits for Analog and Digital Systems," by Franklin H. Belcher, appearing in the March 1956 issue of the Bell System Technical Journal, for more detailed information. Phase-sensitive amplifiers suitable for use in the additional input circuits may be of the type shown in FIG. 12 of said Early patent and described therein.

Inasmuch as the gain of an alternating current amplifer of the negative feedback type is established by the ratio of the feedback resistor, such as the resistor 27 of amplifier 26, to the resistance in series in the input circuit, such for example as resistor 29, it will be understood that the potentiometer 32 may be replaced by a variable resistor. Thus the potentiometer 32 is a variable resistor but has in FIG. 1 the character of a voltage divider to bring it under the classification of a potentiometer. Similarly, the additional sources 37, 46 and 58, while shown in the form of separately powered potentiometers, it is to be understood the resistors forming the potentiometers may be omitted and variable voltage sources as may be provided from variable transformers substituted therefor.

In the claims reference has been made to a first summing amplifier and with reference to amplifier 26 of FIG. 1. The amplifiers 42 and 50 have been referred to as second summing amplifiers in additional input circuits to the first summing amplifier 26. The amplifier 22 has been described as a second amplifier and one included in the input circuit to the first input circuit of the summing amplifier 26. Broadly considered, that input circuit may be taken as extending to and including the secondary winding of input transformer $T_7$.

With this brief explanation of the claims, it is to be understood that they have been drafted to cover the system of FIG. 1 and to include all modifications falling within the scope of the several appended claims.

What is claimed is:

1. A function generator comprising a first summing amplifier having a negative feedback circuit and a first alternating current input circuit, said circuits each including resistors of selected size for establishing, with reference to said first input circuit, a selected value of amplifier gain, a second input circuit for said amplifier including an alternating current source of supply and a resistor for producing zero output from said amplifier with a selected input signal applied to said first input circuit, means including at least one additional input circuit to said summing amplifier for establishing a different amplifier-gain characteristic, each said additional input circuit including an additional summing amplifier of the negative feedback type, one input of which is connected to said first input circuit and an additional input of which has applied thereto an alternating current voltage of selected magnitude, said voltage applied to said last-named input circuit opposing that derived from said first input circuit of said additional summing amplifier, relay means normally disconnecting from said first summing amplifier said additional input circuit, and phase-sensitive means responsive to a change in phase of the output from said additional summing amplifier for operation of said relay means to connect to said first summing amplifier said third input circuit.

2. The function generator of claim 1 in which said relay means has normally closed contacts which during deenergization of the relay means connect said third input circuit to ground.

3. The function generator of claim 1 in which said phase-sensitive means includes an amplifier having zero output when its input is of one phase and having substantial output immediately upon reversal of phase whereby said relay means is operated at a time when said output of said additional amplifier is of a very low order of magnitude.

4. The function generator of claim 1 in which said first-named input circuit includes a series-connected amplifier of the alternating current negative feedback type, said means for establishing a different amplifier-gain charatceristic including at least two additional input circuits to said first summing amplifier, said additional summing amplifier of one of said additional input circuits having its input circuit connected to the input side of said series-connected amplifier and said additional summing amplifier of the other of said additional input circuits being connected to the output side of said series-connected amplifier.

5. A system including the function generator of claim 4 in which there is provided an input amplifier of the alternating current negative feedback type and including adjustable means for establishing a gain of said last-named amplifier for producing an output varying with and proportional to change in the incremental heat rate for a generating station, and connections from the output of said input amplifier to the input of the function generator.

6. A system including the function generator of claim 4 in which there is provided an input amplifier of the alternating current negative feedback type and including adjustable means for establishing a gain of said last-named amplifier for producing an output varying with and proportional to change in the incremental heat rate for a generating station, and voltage-dividing means deriving from said input amplifier an output varying with and proportional to the incremental heat rate of a selected generator for application to the input of the function generator.

7. A function generator comprising a first summing amplifier having a negative feedback circuit and a first alternating current input circuit, said input circuit including a potentiometer to which an input signal may be applied for applying to said amplifier a fractional part of said input signal thereby to establish, with reference to said input circuit, a selected value of amplifier-gain, a second input circuit for said amplifier including an alternating current source of supply and a potentiometer for applying to the amplifier a second input signal having a selected magnitude for producing a zero output from said amplifier with a selected input signal applied to said first input circuit, means including at least one additional input circuit to said summing amplifier for establishing a different amplifier-gain characteristic, each said additional input circuit including an additional summing amplifier of the negative feedback type, one input of which is connected to said first input circuit and an additional input of which has applied thereto an alternating current voltage of selected magnitude, said voltage applied to said last-named input circuit opposing that derived from said first input circuit of said additional summing amplifier, relay means normally disconnecting from said first summing amplifier said additional input circuit, and phase-sensitive means responsive to a change in phase of the output from said additional summing amplifier for operation of said relay means to connect to said first summing amplifier said third input circuit.

8. A function generator comprising a first summing amplifier having a negative feedback circuit and a first alternating current input circuit, said input circuit including a potentiometer to which an input signal may be applied for applying to said amplifier a fractional part of said input signal thereby to establish, with reference to said input circuit, a selected value of amplifier-gain, a second input circuit for said amplifier including an alternating current source of supply and a potentiometer for applying to said amplifier a second input signal having a selected magnitude for producing a zero output from said amplifier with a selected input signal applied to said first input circuit, means including at least a third input circuit to said first summing amplifier for establishing a different amplifier-gain characteristic, each said additional input circuit including an additional summing amplifier of the negative feedback type, one input of which is connected to said first input circuit and an additional input of which has applied thereto an alternating current voltage of selected magnitude, said voltage applied to said last-named input circuit opposing that derived from said first input circuit of said additional summing amplifier, relay means normally disconnecting from said first summing amplifier said additional input circuit, phase-sensitive means responsive to a change in phase of the output from said additional summing amplifier for operation of said relay means to connect to said first summing amplifier said third input circuit, and a potentiometer included in said third input circuit energized from said additional summing amplifier for applying to said third input circuit a predetermined fraction of the output from said additional amplifier upon operation of said relay means.

9. A system including an alternating-voltage function-generator having an input circuit to which there is applied an alternating voltage input signal and an output circuit for producing alternating output voltages of magnitude non-linearly related to the magnitudes of alternating input voltages, said function-generator comprising a summing amplifier of the negative feedback type having a plurality of input circuits, means responsive to said input signal for applying to a first of said input circuits an alternating voltage, means for varying the ratio between the magnitude of the alternating voltage applied to said first input circuit and the resultant component of the alternating output voltage, means responsive to said input signal for producing a second alternating voltage, and relay means responsive to the magnitude of said alternating voltage input signal for applying to a second of said input circuits an alternating voltage derived from said second alternating voltage for changing the relation between said alternating voltage input signal applied to said first input circuit and the output alternating voltage of said summing amplifier.

10. A system comprising a summing amplifier of the negative feedback type having a plurality of input circuits, signal-generating means for producing an input signal varying in accordance with the incremental heat rate of a generator, means for applying to a first of said input circuits an alternating voltage varying in accordance with said input signal, means for varying the ratio between the magnitude of said input signal and the resultant component of the alternating voltage at the output of said summing amplifier to establish a predetermined slope of the characteristic curve relating said input signal to said resultant component of said output voltage, a second means responsive to said input signal for producing a second alternating voltage, and relay means responsive to the magnitude of said alternating voltage input signal for applying to a second of said input circuits an alternating voltage derived from said second alternating voltage for changing said slope of said characteristic curve to take into account a changed relationship between generation and incremental heat rate.

11. The system of claim 10 in which there is provided a third means responsive to said input signal for producing a third alternating voltage, and additional means responsive to the magnitude of said alternating voltage input signal for applying to a third of said input circuits said third alternating voltage for changing the slope of said characteristic curve in a different direction from the change made by said second alternating voltage.

12. The system of claim 11 in which said means for producing said third alternating voltage includes means for applying to said third input circuit an alternating voltage opposite in phase to that applied to said second input circuit.

13. The system of claim 11 in which there is included in said first input circuit an interposed alternating current amplifier of the negative feedback type, the phase of the output thereof being opposite to the phase of said input signal applied to its input, said means for producing respectively said second and said third alternating voltages being connected one to the output and one to the input of said interposed amplifier.

References Cited in the file of this patent
UNITED STATES PATENTS
2,831,107    Raymond _____ Apr. 15, 1958